United States Patent
Buckley et al.

[15] 3,660,130
[45] May 2, 1972

[54] CHROME PIGMENTS

[72] Inventors: Charles Harold Buckley; Geoffrey Lionel Collier; John Mitchell, all of Manchester, England

[73] Assignee: Imperial Chemical Industries Limited, London, England

[22] Filed: May 11, 1970

[21] Appl. No.: 36,472

[30] Foreign Application Priority Data

Sept. 3, 1969 Great Britain.....................43,584/69

[52] U.S. Cl............................106/302, 106/308 Q, 106/309
[51] Int. Cl. .......................................C09c 1/20, C08h 17/04
[58] Field of Search...............................106/302, 308 Q, 309

[56] References Cited

UNITED STATES PATENTS 3,434,857  3/1969  Seelig....................................106/298

Primary Examiner—Tobias E. Levow
Assistant Examiner—J. V. Howard
Attorney—Cushman, Darby & Cushman

[57] ABSTRACT

Chrome pigments of improved durability, especially to atmospheric sulphurous acid, are obtained by adding to a stirred aqueous suspension of a chrome pigment at an initial pH between 1.8 and 8.0 a source of silicate ions, a source of trivalent antimony ions, and oxalic acid, and adjusting the pH to between 5 and 10.5 by addition of a water-soluble basic compound.

7 Claims, No Drawings

CHROME PIGMENTS

This invention relates to chrome pigments of improved fastness properties and a method for their manufacture.

According to the invention there is provided a process for the manufacture of improved chrome pigments which comprises adding to a stirred aqueous suspension of a chrome pigment at an initial pH between 1.8 and 8.0 a source of silicate ions, a source of trivalent antimony ions, and an organic α-hydroxy acid, and adjusting the pH to between 5 and 10.5 by addition of a water-soluble basic compound.

As chrome pigments there are meant chrome yellows such as primrose chromes, lemon chromes, and middle chromes, and molybdenum chromes, middle shade molybdenum chromes and blue shade molybdenum chromes.

The source of silicate ions may be a water-soluble silicate, for example sodium, potassium or ammonium silicate, or may be a compound which breaks down in presence of water to provide silicate ions. It is preferred that the amount of the source of silicate ions should be sufficient to provide silica calculated as $SiO_2$ in amount between 2 and 5 percent of the chrome pigment by weight. The particularly preferred proportion of silica is about 3.5 percent of the weight of pigment. Larger amounts of a source of silicate ions may be used but do not in general provide commensurate improvement in properties.

As a source of trivalent antimony ions there may be mentioned for example trivalent antimony compounds such as antimony trichloride and antimony sulphate. The amount of the source of trivalent antimony ions used should be sufficient to provide antimony calculated as $Sb_2O_3$ in amount from 2 to 5 percent and preferably about 3 percent of the weight of pigment. Larger amounts of a source of antimony ions may be used but do not in general provide a commensurate improvement in properties.

As organic α-hydroxy acids there are meant acids containing a group

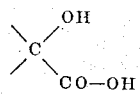

and as examples of such acids there are mentioned citric and tartaric acids, as used in our copending U.S. Pat. application Ser. No. 24086/69, and also acids in which the free valencies of the carbon atom bearing the α-hydroxyl group are satisfied by combination with residues other than aliphatic groups or hydrogen atoms, an example of such acids being oxalic.

The organic α-hydroxy acid may be added as such or in the form of a water-soluble salt. The amount of organic α-hydroxy acid used may be from 3 to 10 percent of the weight of chrome pigment, but more can be used if desired.

In contrast to the silicate and antimony ions which remain in the pigment product the α-hydroxyacids do not appear in the final pigment product to any significant extent but remain in the aqueous medium. Without prejudice to the scope of this invention it is believed that the affect of the organic α-hydroxy acid is to assist in obtaining a coating of antimony oxide on the surface of the pigment which coating is the cause of the increased fastness in the pigment.

The process may be carried out by mixing aqueous solutions of the silicate, the antimony compound and the organic α-hydroxy acid with the pigment suspension in any order at an initial pH adjusted to between about 1.8 and 8 and then raising the pH of the mixture to 5 – 10.5 by addition of the water-soluble basic compound, for example sodium and potassium hydroxide or carbonate or ammonia. It is preferred to raise the pH not higher than 9 since the use of higher pH does not confer any significant benefit and at pH about 10.5 some decomposition of the pigment may occur. The preferred pH is about 8.0.

The pigment products obtained may be used in any conventional manner. For example they may be dispersed in paint media based on natural or synthetic resins such as short oil alkyds, long oil alkyds, formaldehyde/urea condensates, formaldehyde/melamine condensates, acrylic resins or isocyanate-modified alkyds. The paints obtained afford coatings of improved fastness especially to atmospheric sulphurous acid.

The invention is illustrated but not limited by the following example in which all parts and percentages are by weight unless otherwise stated.

EXAMPLE

One hundred and ten parts of lead nitrate are dissolved in 500 parts water at 45° C., the pH is adjusted to 3.0 and the solution is added with stirring over 30 minutes to a solution of 48.8 parts of sodium dichromate and 12.8 parts of sodium hydroxide in 1,600 parts of water at 45° C. the precipitated pigment is washed twice by decantation. Sulphuric acid (about 1 part is necessary) dissolved in 10 parts of water is added to bring the pH to 1.8 and 11.0 parts of sodium silicate (30 percent $SiO_2$) dissolved in 100 parts of water are added with stirring (the pH rises to about 9.0) followed by a solution of 4.4 parts of antimony trichloride, 8.8 parts of oxalic acid, and 9.0 parts of potassium hydroxide in 160 parts of water. Sodium carbonate (about 3 parts are necessary) dissolved in 30 parts of water is added with stirring to bring the pH to 8.0. The pigment is collected by filtration, washed with water until free from electrolyte and dried at 90° C.

The pigment so obtained is dispersed by grinding in a ball mill with an alkyd/melamine-formaldehyde resin and applied to tin plate panels using a 10/1,000 inch applicator and allowed to cure. The panels and panels similarly prepared from pigments not treated as above are placed in the Canning Apparatus (conforms to B.S.S. 1224/1959) and subjected to the action of moist sulphur dioxide. The coatings containing the treated pigment show superior resistance to sulphur dioxide.

We claim:
1. A process for the manufacture of improved chrome pigments which comprises adding to a stirred aqueous suspension of a chrome pigment at an initial pH between 1.8 and 8.0 a source of silicate ions, a source of trivalent antimony ions, and oxalic acid, and adjusting the pH to between 5 and 10.5 by addition of a water-soluble basic compound.

2. A process as claimed in claim 1 wherein the pH is adjusted to between 5 and 9 by addition of a water-soluble basic compound.

3. A process as claimed in claim 1 wherein the amount of the source of silicate ions provides silica in amount between 2 and 5 percent of the chrome pigment.

4. A process as claimed in claim 1 wherein the silica provided is 3.5 percent of the weight of chrome pigment.

5. A process as claimed in claim 1 wherein the amount of the source of trivalent antimony ions provides antimony calculated as $Sb_2O_3$ in amount between 2 and 5 percent of the weight of pigment.

6. A process as claimed in claim 1 wherein the antimony calculated as $Sb_2O_3$ provided is 3 percent of the weight of chrome pigment.

7. A process as claimed in claim 1 wherein the amount of oxalic acid is from 3 to 10 percent of the weight of chrome pigment.

* * * * *